(12) United States Patent
Lin et al.

(10) Patent No.: US 11,425,379 B2
(45) Date of Patent: Aug. 23, 2022

(54) METHOD AND APPARATUS OF LATENCY REDUCTION FOR CHROMA RESIDUE SCALING

(71) Applicant: MEDIATEK INC., Hsinchu (TW)

(72) Inventors: Zhi-Yi Lin, Hsinchu (TW); Tzu-Der Chuang, Hsinchu (TW); Ching-Yeh Chen, Hsinchu (TW); Chih-Wei Hsu, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

(21) Appl. No.: 17/614,703

(22) PCT Filed: May 29, 2020

(86) PCT No.: PCT/CN2020/093499
§ 371 (c)(1),
(2) Date: Nov. 29, 2021

(87) PCT Pub. No.: WO2020/239110
PCT Pub. Date: Dec. 3, 2020

(65) Prior Publication Data
US 2022/0150496 A1 May 12, 2022

Related U.S. Application Data

(60) Provisional application No. 62/905,581, filed on Sep. 25, 2019, provisional application No. 62/876,094, (Continued)

(51) Int. Cl.
*H04N 19/119* (2014.01)
*H04N 19/184* (2014.01)
(Continued)

(52) U.S. Cl.
CPC ......... *H04N 19/119* (2014.11); *H04N 19/132* (2014.11); *H04N 19/146* (2014.11); *H04N 19/184* (2014.11)

(58) Field of Classification Search
CPC .............. H04N 19/119; H04N 19/132; H04N 19/146; H04N 19/184
See application file for complete search history.

(56) References Cited

U.S. PATENT DOCUMENTS

| 9,984,446 B2 | 5/2018 | Ha et al. |
| 2015/0243200 A1 | 8/2015 | Pan |
| 2017/0085879 A1 | 3/2017 | Minoo et al. |
| 2018/0115777 A1 | 4/2018 | Piramanayagam et al. |

(Continued)

FOREIGN PATENT DOCUMENTS

TW 501075 B 9/2002

OTHER PUBLICATIONS

International Search Report and Written Opinion dated Jul. 29, 2020, issued in application No. PCT/CN2020/093499.
(Continued)

*Primary Examiner* — Tat C Chio
(74) *Attorney, Agent, or Firm* — McClure, Qualey & Rodack, LLP (57) ABSTRACT

A method and apparatus of video coding are disclosed. A piece-wise linear mapping is derived to map a target luma sample from a first signal domain to a second signal domain, or vice versa. The piece-wise linear mapping process comprises determining first pivot points for performing video encoding or decoding of the luma samples using a piece-wise linear mapping. The first pivot points are determined so that: if a target mapped pivot point corresponding to one first pivot point in the second signal domain has a multiple of the target interval value, the target mapped pivot point and a next mapped pivot point can be located in a same second (Continued)

segment; and otherwise, the target mapped pivot point and the next mapped pivot point cannot be located in the same second segment.

18 Claims, 4 Drawing Sheets

Related U.S. Application Data filed on Jul. 19, 2019, provisional application No. 62/865,390, filed on Jun. 24, 2019, provisional application No. 62/855,007, filed on May 31, 2019.

(51) Int. Cl.
*H04N 19/146* (2014.01)
*H04N 19/132* (2014.01)

(56) References Cited

U.S. PATENT DOCUMENTS

| | | |
|---|---|---|
| 2018/0182352 A1 | 6/2018 | Ballestad et al. |
| 2018/0278967 A1* | 9/2018 | Kerofsky ............. H04N 19/186 |
| 2019/0014330 A1 | 1/2019 | Ramasubramonian et al. |
| 2019/0132600 A1 | 5/2019 | Francois et al. |
| 2019/0156468 A1 | 5/2019 | Olivier et al. |
| 2021/0029361 A1* | 1/2021 | Lu ........................ H04N 19/182 |

OTHER PUBLICATIONS

François, E., et al.; "CE12-related: in-loop luma reshaping with approximate inverse mapping function;" Joint Video Experts Team (JVET) of ITU-T SG 16 WP 3 and ISO/IEC JTC 1/SC 29/WG 11; Jan. 2019; pp. 1-6.

Chinese language office action dated Feb. 24, 2021, issued in application No. TW 109118139.

* cited by examiner

METHOD AND APPARATUS OF LATENCY REDUCTION FOR CHROMA RESIDUE SCALING

CROSS REFERENCE TO RELATED APPLICATIONS

The present invention claims priority to U.S. Provisional Patent Application, Ser. No. 62/855,007, filed on May 31, 2019, U.S. Provisional Patent Application, Ser. No. 62/865,390, filed on Jun. 24, 2019, U.S. Provisional Patent Application, Ser. No. 62/876,094, filed on Jul. 19, 2019 and U.S. Provisional Patent Application, Ser. No. 62/905,581, filed on Sep. 25, 2019. The U.S. Provisional Patent Applications are hereby incorporated by reference in their entireties.

FIELD OF THE INVENTION

The present invention relates to video coding for color video data, where luma mapping is applied to the luma component. In particular, the present invention discloses techniques to simplify derivation of inverse luma mapping.

BACKGROUND AND RELATED ART

Figure 1:
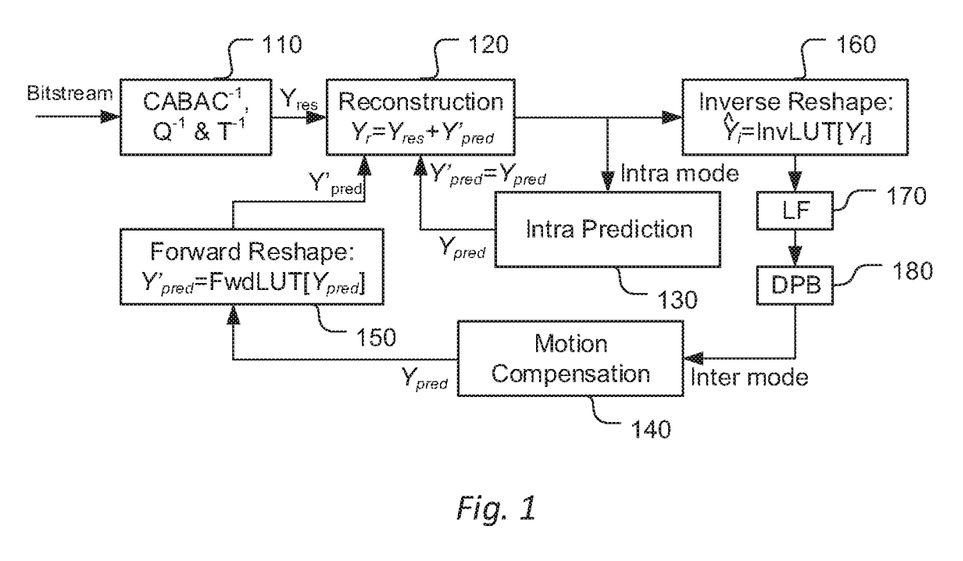
FIG. 1 illustrates an exemplary block diagram of a video decoder incorporating luma reshaping process.

The Versatile Video Coding (VVC) is an emerging video coding standard being developed by the Joint Video Experts Team, a collaborative team formed by the ITU-T Study Group 16 Video Coding Experts Group and ISO/IEC JTC1 SC29/WG11 (Moving Picture Experts Group, MPEG). The VVC is based on the HEVC (High Efficient Video Coding) video standard with improved and new coding tools. For example, reshaping process is a new coding tool adopted in VTM-4.0 (VVC Test Model Ver. 4.0). The reshaping process is also referred as LMCS (Luma Mapping and Chroma Scaling). When reshaping is applied, the video samples are coded and reconstructed in the reshaped domain before loop filtering. The reshaped-domain reconstructed samples are converted to the original domain by using the inverse reshaping. The loop-filtered original-domain reconstructed samples are stored in the decoded picture buffer. For Inter mode, the motion compensated (MC) predictors are converted to the reshaped domain by using the forward reshaping. FIG. 1 shows the example of reshaping process at a decoder side.

As shown in FIG. 1, the bitstream is processed by CABAC (context-adaptive binary arithmetic coding) decoder (i.e., $CABAC^{-1}$), inverse quantization (i.e., $Q^{-1}$) and inverse transform ($T^{-1}$) to derive reconstructed luma residue $Y_{res}$. The reconstructed luma residue is provided to the luma reconstruction block 120 to generate reconstructed luma signal. For Intra mode, the predictor comes from the Intra prediction block 130. For Inter mode, the predictor comes from the motion compensation block 140. Since reshaping is applied to the luma signal at the encoder side, the forward reshaping 150 is applied the predictor from the motion compensation block 140 before the predictor is provided to the reconstruction block 120. The inverse reshaping 160 is applied to the reconstructed luma signal from the reconstruction block 120 to recover the un-shaped reconstructed luma signal. Loop filter 170 is then applied to the un-shaped reconstructed luma signal before the signal is stored in the decoded picture buffer (DPB) 180.

Figure 2:
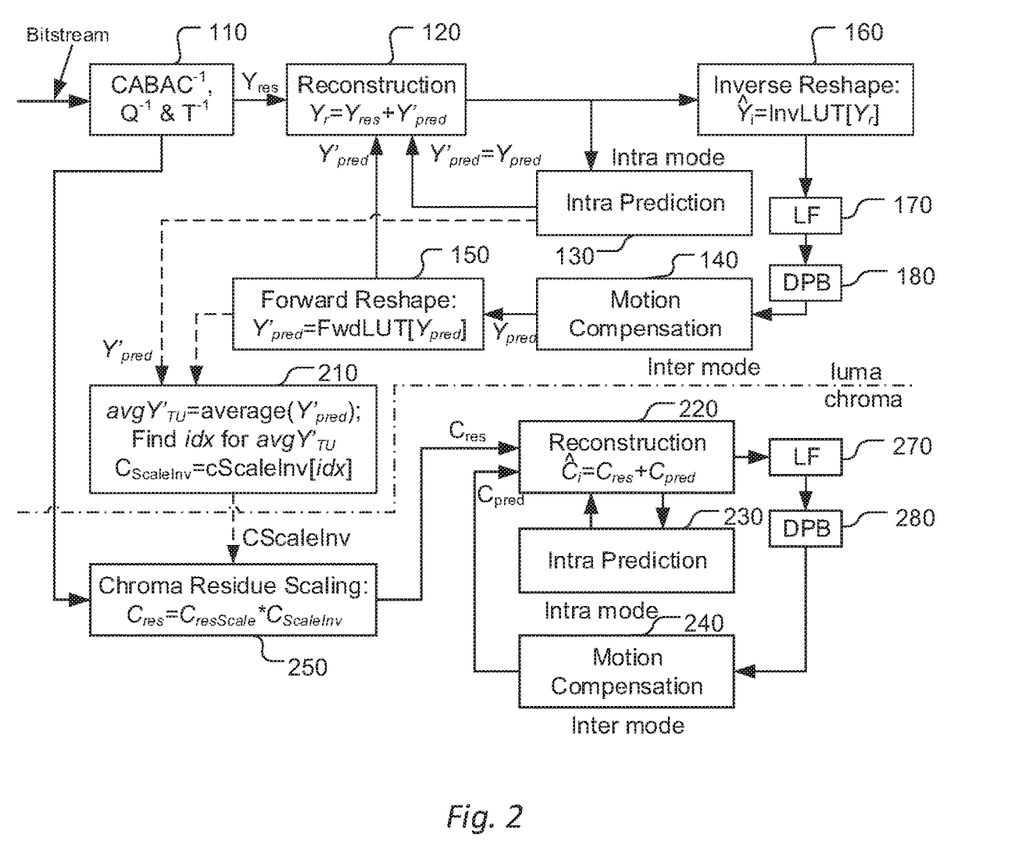
FIG. 2 illustrates an exemplary block diagram of a video decoder incorporating luma reshaping process and chroma scaling.

When reshaping is applied, the chroma residue scaling is also applied. Chroma residue scaling compensates for luma signal interaction with the chroma signal, as shown in FIG. 2. In FIG. 2, the upper part corresponds to the luma decoding and the lower part corresponds to the chroma decoding.

Chroma residue scaling is applied at the TU level according to the following equations at the encoder side and the decoder side respectively:

$$\text{Encoder side: } C_{ResScale} = C_{Res} * C_{Scale} = C_{Res}/C_{ScaleInv} \quad (1)$$

$$\text{Decoder side: } C_{Res} = C_{ResScale}/C_{Scale} = C_{ResScale} * C_{ScaleInv} \quad (2)$$

In the above equations, $C_{Res}$ is the original chroma residue signal and $C_{ResScale}$ is the scaled chroma residue signal. $C_{Scale}$ is a scaling factor calculated using FwdLUT (i.e., forward look-up table) for Inter mode predictors and is converted to its reciprocal $C_{ScaleInv}$ to perform multiplication instead of division at the decoder side, thereby reducing implementation complexity. The scaling operations at both encoder and decoder side are implemented with fixed-point integer arithmetic with the following equation:

$$c' = \text{sign}(c) * ((\text{abs}(c) * s + 2^{CSCALE\_FP\_PREC-1}) >> CSCALE\_FP\_PREC) \quad (3)$$

In the above equation, c is chroma residue, s is chroma residue scaling factor from cScaleInv[pieceIdx], pieceIdx is decided by the corresponding average luma value of the TU, and CSCALE_FP_PREC is a constant value to specify precision. For deriving the scaling factor, the predictor of the whole TU is used. The value of $C_{ScaleInv}$ is computed in the follow steps:

(1) If Intra mode, compute average of Intra predicted luma values; if Inter mode, compute average of forward reshaped Inter predicted luma values. In other words, the average luma value $avgY'_{TU}$ is computed in the reshaped domain.

(2) Find index idx, where $avgY'_{TU}$ belongs to inverse mapping PWL.

(3) $C_{ScaleInv}$ = cScaleInv[idx]

The steps to derive the chroma scaling factor $C_{ScaleInv}$ are performed by block 210 in FIG. 2. The derived chroma scaling factor $C_{ScaleInv}$ is used to convert the scaled chroma residue, which is reconstructed through CABAC (context-adaptive binary arithmetic coding) decoding (i.e., $CABAC^{-1}$), inverse quantization (i.e., $Q^{-1}$) and inverse transform ($T^{-1}$). Reconstruction block 220 reconstruct the chroma signal by adding the predictor to the reconstructed chroma residue. For Intra mode, the predictor comes from the Intra prediction block 230. For Inter mode, the predictor comes from the motion compensation block 240. Loop filter 270 is then applied to the reconstructed chroma signal before the signal is stored in the chroma decoded picture buffer (DPB) 280.

Figure 3A:
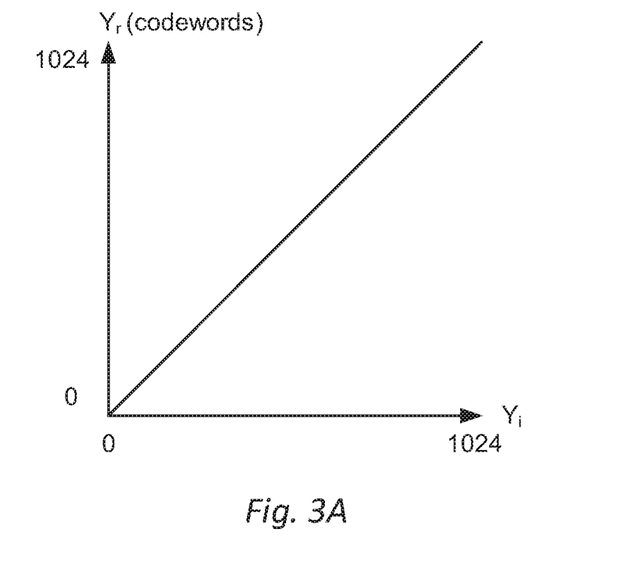
FIG. 3A illustrates an example of 1:1 luma mapping, where the output (i.e., reshaped luma) is the same as the input.
Figure 3B:
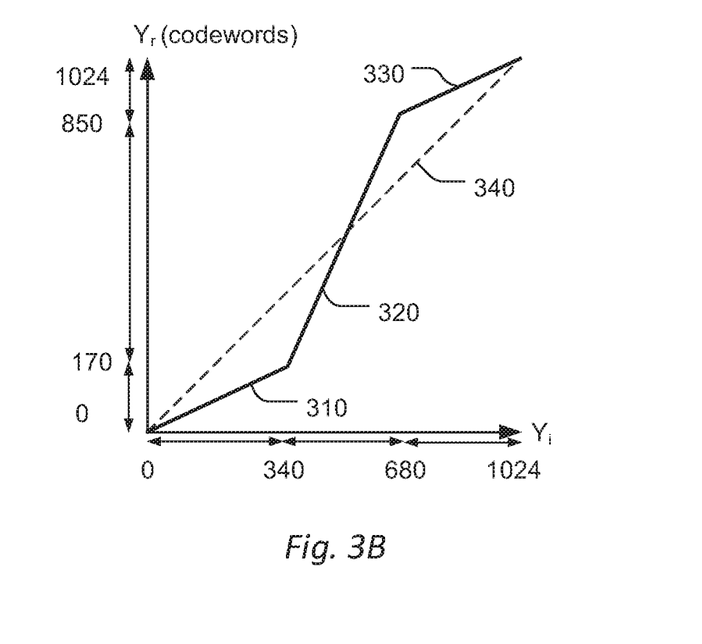
FIG. 3B illustrates an example of piece-wise linear (PWL) luma mapping having 3 segments.

FIG. 3A and FIG. 3B illustrate an example of luma mapping. In FIG. 3A, a 1:1 mapping is shown where the output (i.e., reshaped luma) is the same as the input. Since the histogram of the luma samples usually is not flat, using intensity shaping may help to improve performance in the RDO (rate-distortion optimization) sense. The statistics of the luma samples is calculated for an image area, such as a picture. A mapping curve is then determined according to the statistics. Often, a piece-wise linear (PWL) mapping curve is used. FIG. 3B illustrates an example of piece-wise linear (PWL) mapping having 3 segments, where two neighboring segments have different slopes. The dashed line 340 corresponds to the 1:1 mapping. If samples ranging from 0 to 340 have larger spatial variance and the number of occurrences is smaller, the input range 0-340 is mapped to a smaller output range (i.e., 0-170), as shown in segment 310 of FIG. 3B. If samples ranging from 340 to 680 have smaller spatial variance and the number of occurrences is larger, the input range 340-680 is mapped to a larger output range (i.e., 170-850), as shown in segment 320 of FIG. 3B. If samples ranging from 680 to 1023 have larger spatial variance and the number of occurrences is smaller, the input range 680-1023 is mapped to a smaller output range (i.e., 850-1023), as shown in segment 330 of FIG. 3B. FIG. 3B is intended to illustrate a simple PWL mapping. In practice, the PWL mapping may have more or less segments.

Intra Sub-Block Partition (ISP) and Sub-Block Transform (SBT)

To generate better Intra mode predictors, the Intra sub-block partition (ISP) can be applied. When the ISP is applied, the luma component is divided into multiple sub-TBs. The sub-TBs are reconstructed one by one. For each sub-TU, the reconstructed sample of neighboring sub-TB can be used as the neighboring reconstructed samples for Intra prediction. For chroma component TB, it will not be divided into multiple sub-TBs as luma does.

Similar to ISP, the sub-block transform (SBT) can be applied to Inter mode. When SBT is applied, only part of the CU data are transformed. For example, the current block can be divided into two partitions by horizontal split or vertical split. Only one of the partition can be used for transform coding. The residue of the other partition is set to zero. For example, the CU is divided into two TUs or four TUs. Only one of the TU has non-zero coefficient.

Signaling of LMCS Parameters

The syntax table of LMCS parameters being considered by the VVC is shown in Table 1.

TABLE 1

| | Descriptor |
| --- | --- |
| lmcs_data ( ) { | |
|   lmcs_min_bin_idx | ue(v) |
|   lmcs_delta_max_bin_idx | ue(v) |
|   lmcs_delta_cw_prec_minus1 | ue(v) |
|   for ( i = lmcs_min_bin_idx; i <= LmcsMaxBinIdx; i++ ) { | |
|     lmcs_delta_abs_cw[ i ] | u(v) |
|     if( lmcs_delta_abs_cw[ i ] ) > 0) | |
|       lmcs_delta_sign_cw_flag[ i ] | u(1) |
|   } | |
| } | |

In the above syntax table, the semantics of the syntaxes are defined as follows:

lmcs_min_bin_idx specifies the minimum bin index of the PWL (piece-wise linear) model for luma mapping lmcs_delta_max_bin_idx specifies the delta value between 15 and the maximum bin index LmcsMaxBinIdx used in the lmcs. The value should be in the range of 1 to 15, inclusive.

lmcs_delta_cw_prec_minus1 plus 1 is the number of bits used for the representation of the syntax lmcs_delta_abs_cw [i].

lmcs_delta_abs_cw[i] is the absolute delta codeword value for the i-th bin.

lmcs_delta_sign_cw_flag[i] is the sign of the variable lmcsDeltaCW[i].

Variable lmcsDeltaCW[i] is derived as follows:

lmcsDeltaCW[i]=(1−2*lmcs_delta_sign_cw_flag[i]) *lmcs_delta_abs_cw[i].

Variables lmcsCW[i] with i=0 . . . 15 specify the number of codewords for each interval in the mapped domain. It can be derived as follows:

OrgCW=(1<<BitDepthY)/16

For i=0 . . . lmcs_min_bin_idx−1, lmcsCW[i] is set equal 0.

For i=lmcs_min_bin_idx . . . LmcsMaxBinIdx, the following applies:
  lmcsCW[i]=OrgCW+lmcsDeltaCW[i]
  The value of lmcsCW[i] shall be in the range of (OrgCW>>3) to (OrgCW<<3−1), inclusive.

For i=LmcsMaxBinIdx+1 . . . 15, lmcsCW[i] is set equal 0.

To represent the PWL model of the reshaping curve, three variables LmcsPivot[i] with i=0 . . . 16, ScaleCoeff[i] with i=0 . . . 15, and InvScaleCoeff[i] with i=0 . . . 15, are derived as follows:

```
LmcsPivot[ 0 ] = 0;
  for( i = 0; i <= 15; i++ ) {
    LmcsPivot[ i + 1 ] = LmcsPivot[ i ] + lmcsCW[ i ]
    ScaleCoeff[ i ] = ( lmcsCW[ i ] * (1 << SCALE_FP_PREC) + (1 <<
        (Log2(OrgCW) − 1))) >> (Log2(OrgCW))
    if ( lmcsCW[ i ] == 0 )
      InvScaleCoeff[ i ] = 0
    else
      InvScaleCoeff[ i ] = OrgCW * (1 << SCALE_FP_REC) /
        lmcsCW[ i ]
  }
```

In the above derivation, SCALE_FP_PREC is a constant value to specify precision.

In the conventional LMCS process, the inverse luma mapping, such as comparing a to-be-mapped luma sample with multiple thresholds, is rather time consuming. Therefore, it is desirable to develop techniques to simplify the inverse mapping process.

BRIEF SUMMARY OF THE INVENTION

A method and apparatus of video coding are disclosed. According to one method of the present invention, a plurality of first segments is determined, where a luma sample range corresponding to luma samples in a first signal domain is divided into the plurality of first segments, and each first segment corresponds to one line piece mapping the luma samples from the first signal domain to a second signal domain. In addition, a plurality of second segments is determined, where the luma sample range corresponding to the luma samples in the second signal domain is divided into the plurality of second segments, and all second segments have a same size equal to a target interval value. One or more first pivot points are determined or derived, where each first pivot point is associated with one first segment, and wherein said one or more first pivot points are determined or derived so that: if a target mapped pivot point corresponding to one first pivot point in the second signal domain has a multiple of the target interval value, the target mapped pivot point and a next mapped pivot point are allowed to be located in a same second segment; and otherwise, the target mapped pivot point and the next mapped pivot point are not allowed to be located in the same second segment. Video encoding or decoding of the luma samples are performed using a piece-wise linear mapping to map a target luma sample from the first signal domain to the second signal domain, or from the second signal domain to the first signal domain.

In one embodiment, the piece-wise linear mapping is associated with the plurality of first segments, the plurality of second segments and said one or more first pivot points.

In one embodiment, all of the first segments have a same first interval value. For example, the first interval value corresponds to 2 to a power of a first pre-defined number and the first pre-defined number is an integer. Furthermore, the first pre-defined number can be equal to (bitDepth−4) and the bitDepth represents bit depth of the luma samples.

In one embodiment, the target interval value corresponds to 2 to a power of a second pre-defined number and the second pre-defined number is an integer. For example, the second pre-defined number is equal to (bitDepth−5) and the bitDepth represents bit depth of the luma samples.

In one embodiment, each second segment has at most two mapped pivot point. In one embodiment, the luma sample range is equal to 0 to 1023, inclusive, and the target interval value is equal to 32.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The LMCS maps luma samples in original domain to a reshaped domain for better data estimation. The mapping curve is approximated by piece-wise linear model. To transform the sample values from original domain to reshaped domain, a look-up-table (LUT) is used. The entry number of the LUT is the same as the input sample dynamic range. For example, if a 10-bits input is used, a 1024 entries LUT is used. If a 14-bits input is used, an 8192 entries LUT is used. In the hardware implementation, this kind of LUT is cost expensive. Therefore, the piece-wise linear model can be used. The input can be compared to each piece to find out which piece the input belongs to. In each piece, the corresponding output value can be calculated according to the characteristic of this piece.

Method 1—LMCS with a Default Number of Codewords

In one embodiment, the number of codewords for each bin in the mapped domain (e.g. lmcsCW[i]) can be derived using a default number of codewords instead of using OrgCW, which only depends on the bit depth of the input data.

In the proposed method, the variables lmcsCW[i] with i=lmcs_min_bin_idx to LmcsMaxBinIdx, are derived according to:
lmcsCW[i]=default_CW+lmcsDeltaCW[i],
In the above equation, the default_CW is derived at the decoder side or signaled from the encoder side.

In one embodiment, if the default_CW is derived at decoder side, it can be derived according to the lmcs_min_bin_idx and LmcsMaxBinIdx. If the sum of the number of bins less than lmcs_min_bin_idx and the number of bins larger than LmcsMaxBinIdx is larger, the default_CW can be adjusted to a value larger than OrgCW.

For example, if the sum of the number of bins less than lmcs_min_bin_idx and the number of bins larger than LmcsMaxBinIdx is equal to 2, default_CW is derived as default_CW=OrgCW+A, where A is a positive integer number (e.g. 1, 2, 3 . . . ).

If the sum of the number of bins less than lmcs_min_bin_idx and the number of bins larger than LmcsMaxBinIdx is equal to 0, then the default_CW is equal to OrgCW.

In one embodiment, if the default_CW is signaled, two syntaxes, default_delta_abs_CW and default_delta_sign_CW_flag are signaled before lmcs_delta_cw_prec_minus1.

The variable default_delta_abs_CW represents the absolute difference of the default_CW and OrgCW, and the variable default_delta_sign_CW_flag indicates whether the delta value is positive or negative. default_delta_sign_CW_flag is only signaled if default_delta_abs_CW is larger than 0.

In one embodiment, if the default_CW is signaled, a syntax default_delta_CW is signaled after lmcs_delta_cw_prec_minus1.

In one embodiment, if the default_CW is signaled, another syntax lmcs_delta_default_cw_prec_minus1 is signaled before the syntax default_delta_CW, indicating how many bins are required for the syntax default_delta_CW.

The variable default_delta_CW represents the difference between the default_CW and OrgCW.

Method 2—Simplified Inverse Mapping

For the luma mapping, variable InputPivot[i] is defined, where InputPivot[i] represent the pivot points for the input luma samples. The variable InputPivot[i], with i=0 . . . 16, is derived as follows:
InputPivot[i]=i*OrgCW.

In the original design, the inverse scale values are stored in a table with 16 entries, and each entry corresponds to each piece of the PWL mapping. Therefore, when doing inverse mapping, in order to know the piece that the to-be-mapped luma sample belongs to, the to-be-mapped luma samples need to be compared to the pivots of all pieces in the reshaped domain to locate the piece that the to-be-mapped luma samples belong to. This procedure requires at most 15 comparisons for each to-be-mapped luma sample, and the derivation is as follows.

if (lumaSample<LmcsPivot[lmcs_min_bin_idx+1])
    idxYInv=lmcs_min_bin_idx
    else if (lumaSample>=LmcsPivot[LmcsMaxBinIdx])
    idxYInv=LmcsMaxBinIdx
    else {
    for(idxYInv=lmcs_min_bin_idx; idxYInv<LmcsMaxBinIdx; idxYInv++) {if (lumaSample<LmcsPivot [idxYInv+1])
      break
      }
    }

In the above derivation, lumaSample is the to-be-mapped luma sample, LmcsPivot[i] with i=0 . . . 16 is the pivot of each piece in the reshape domain, lmcs_min_bin_idx is the minimum bin index used in the luma mapping, LmcsMaxBinIdx is the maximum bin index used in the luma mapping, and idxYInv is the piece that the luma sample lumaSample belongs to.

Method 2.1 Reconstructing the Inverse Reshaping Curve

To simplify the inverse mapping process, it is proposed to re-construct the inverse mapping curve according to the signaled forward mapping curve. The luma samples in the reshaped domain are divided into pieces with size equal to (1<<LOG2_INVERSE_INTERVAL), and each piece has its own inverse scale value and inverse input pivots. The inverse scale value for each piece is implemented with a table with size equal to ((1<<bitDepth)>>LOG2_INVERSE_INTERVAL), where bitDepth is the internal bit depth. When finding the piece that the to-be-mapped luma samples belong to, we only need to right shift the to-be-mapped luma samples by LOG2_INVERSE_INTERVAL (i.e., $\log_2$ (INVERSE_INTERVAL)), then the index of the piece and the inverse input pivot can be derived and hence the inverse scale value and the inverse input pivot can be found.

The inverse scale value of each interval in the reshaped domain is derived by dividing the difference of the first inverse luma samples and the last inverse luma samples with the size of the interval in the reshaped domain.

In one example, the inverse scale values table is constructed by following steps:

Step1. Derive the forward scale values according to the signaled LMCS data

To represent the PWL model of the reshaping curve, three variables LmcsPivot[i] with i=0 . . . 16, ScaleCoeff[i] with i=0 . . . 15, and InvScaleCoeff tmp[i] with i=0 . . . 15, are derived as follows:

```
LmcsPivot[ 0 ] = 0;
  for( i = 0; i <= 15; i++ ) {
    LmcsPivot[ i + 1 ] = LmcsPivot[ i ] + lmcsCW[ i ]
    ScaleCoeff[ i ] = ( lmcsCW[ i ] * (1 << SCALE_FP_PREC) + (1 <<
    (Log2(OrgCW) - 1))) >> (Log2(OrgCW))
      if ( lmcsCW[ i ] == 0 )
        InvScaleCoeff_tmp [ i ] = 0
      else
        InvScaleCoeff_tmp [ i ] = OrgCW * (1 << SCALE_FP_PREC) /
        lmcsCW[ i ]
  }
```

Step2. Find the inverse mapped pivot value

For luma samples equal to multiples of (1<<LOG2_INVERSE_INTERVAL) within the range of 0 to (1<<BitDepth)-1, inclusive, a variable InputPivot_inv [i>>LOG2_INVERSE_INTERVAL] is derived as follows.

if (i<LmcsPivot [lmcs_min_bin_idx])
InputPivot_inv[i>>LOG2_INVERSE_INTERVAL]=
(OrgCW)*lmcs_min_bin_idx
if (i>=LmcsPivot [LmcsMaxBinIdx+1])
InputPivot_inv[i>>LOG2_INVERSE_INTERVAL]=
(OrgCW)*(LmcsMaxBinIdx+1)
Otherwise,
InputPivot_inv[i>>LOG2_INVERSE_INTERVAL]=
InputPivot[idxYInv]+InvScaleCoeff tmp[idxYInv]*(i-LmcsPivot[idxYInv])+(1<<(SCALE_FP_PREC-1))>>SCALE_FP_PREC.

In the above equation, idxYInv is derived by setting lumaSample equal to i, and then follows the procedure below:
if (lumaSample<LmcsPivot[lmcs_min_bin_idx+1])
idxYInv=lmcs_min_bin_idx
else if (lumaSample>=LmcsPivot[LmcsMaxBinIdx])
idxYInv=LmcsMaxBinIdx
else {
for(idxYInv=lmcs_min_bin_idx;
idxYInv<LmcsMaxBinIdx; idxYInv++) {
if(lumaSample<LmcsPivot [idxYInv+1])
break;
}
}

Step3. Derive inverse scale value for each piece

For the piece with index equal to i, i=0 . . . (LmcsPivot [LmcsMaxBinIdx+1]>>LOG2_INVERSE_INTERVAL):
If ((i==(LmcsPivot [LmcsMaxBinIdx+1]>>LOG2_INVERSE_INTERVAL)) && (LmcsPivot [LmcsMaxBinIdx+1]!=(i<<LOG2_INVERSE_INTERVAL))
InvScaleCoeff[i]=(InputPivot_inv [i+1]−InputPivot_inv [i])*(1<<SCALE_FP_PREC)/(LmcsPivot [LmcsMaxBinIdx+1]−(i<<LOG2_INVERSE_INTERVAL))
Otherwise,
InvScaleCoeff[i]=(InputPivot_inv [i+1]−InputPivot_inv [i])*(1<<SCALE_FP_PREC)/
(1<<LOG2_INVERSE_INTERVAL).

In another embodiment, for piece with index equal to i, i=0 . . . (((1<<bitDepth)−1)>>LOG2_INVERSE_INTERVAL)−1:
InvScaleCoeff[i]=(InputPivot_inv [i+1]−InputPivot_inv [i])*(1<<SCALE_FP_PREC)/
(1<<LOG2_INVERSE_INTERVAL)

The Inverse Mapping

For the inverse mapping, the variable idxYInv is derived by (lumaSample>>LOG2_INVERSE_INTERVAL), where lumaSample is the to-be-mapped luma sample. In other words, idxYInv is derived by right-shifting lumaSample by LOG2_INVERSE_INTERVAL bits. The variable invSample is derived as follows:
invSample=InputPivot_inv[idxYInv]+(InvScaleCoeff [idxYInv]*(lumaSample−(idxYInv<<LOG2_INVERSE_INTERVAL))+(1<<(SCALE_FP_PREC−1)))>>SCALE_FP_PREC The inverse mapped luma sample invLumaSample is derived as follows:
invLumaSample=Clip1 (invSample).

In the above equation, Clip1 (x)=Clip3 (0, (1<<BitDepth)−1, x), where BitDepth is the bit depth of the underlying data x. Clip3 (x, y, z) is defined as:

$$\text{Clip3}(x, y, z) = \begin{cases} x; & z < x \\ y; & z > y \\ z; & \text{otherwise} \end{cases}.$$

Case for the Chroma Scaling being Enabled

In this case, the variable ChromaScaleCoeff[i], with i=0 . . . (((1<<bitDepth)−1)>>LOG2_INVERSE_INTERVAL)−1, is derived as follows:
if (InvScaleCoeff[i]==0)
ChromaScaleCoeff[i]=(1<<CSCALE_FP_PREC)
else
ChromaScaleCoeff[i]=InvScaleCoeff[i].

In the above equation, CSCALE_FP_PREC is a constant value to specify precision. The process to find the chroma scaling value becomes:
1. Find the reference luma sample value (S)
2. Idx=(S>>LOG2_INVERSE_INTERVAL)
3. The chroma scaling factor (varScale)=ChromaScaleCoeff[Idx]

Method 2.2 Construct Mapping Table from Piece_Reshaped to Piece_Original (MapIdxRtoIdxO[ ])

It is proposed to construct a mapping table from pieceIdx reshaped to pieceIdx original according to the signaled forward mapping curve. The luma samples in the reshaped domain are divided into intervals with size equal to (1<<LOG2_INVERSE_INTERVAL), and each interval has its corresponding index of the piece in the original domain. The size of the mapping table MapIdxRtoIdxO is equal to ((1<<bitDepth)−1>>LOG2_INVERSE_INTERVAL), where bitDepth is the internal bit depth. When finding the piece that the to-be-mapped luma samples belong to for inverse mapping, we only need to right shift the to-be-mapped luma samples by LOG2_INVERSE_INTERVAL, and find its corresponding index of the piece in the original domain which can be found by using the table MapIdxRtoIdxO (e.g. MapIdxRtoIdxO[S>>LOG2_INVERSE_INTERVAL], where S is the to-be-mapped luma sample).

In another embodiment, for each piece in the reshaped domain, the corresponding index of the piece in the original domain can be derived by using the majority of the luma samples' indices of the original domain.

In one embodiment, for each piece in the reshaped domain, the corresponding index of the piece in the original domain can be derived by using the first luma sample's index of the original domain. In one example, the table MapIdxRtoIdxO can be constructed as below. For luma samples equal to (i<<LOG2_INVERSE_INTERVAL), where i=0 . . . (((1<<bitDepth)−1)>>LOG2_INVERSE_INTERVAL):

If (i<<LOG2_INVERSE_INTERVAL)<LmcsPivot [lmcs_min_bin_idx]) MapIdxRtoIdxO[i]=lmcs_min_bin_idx If (i<<LOG2_INVERSE_INTERVAL)>=LmcsPivot [LmcsMaxBinIdx+1]) MapIdxRtoIdxO[i]=LmcsMaxBinIdx Otherwise, MapIdxRtoIdxO[i]=idxYInv In the above equations, idxYInv is derived by setting lumaSample equal to (i<<LOG2_INVERSE_INTERVAL), and follows the procedure below:

if (lumaSample<LmcsPivot[lmcs_min_bin_idx+1])

idxYInv=lmcs_min_bin_idx else if (lumaSample>=LmcsPivot[LmcsMaxBinIdx])

idxYInv=LmcsMaxBinIdx else { for(idxYInv=lmcs_min_bin_idx; idxYInv<LmcsMaxBinIdx; idxYInv++) {if (lumaSample<LmcsPivot [idxYInv+1])

break;

}

}

The Inverse Mapping

The variable idxYInv is derived by MapIdxRtoIdxO [(lumaSample>>LOG2_INVERSE_INTERVAL)], where lumaSample is the to-be-mapped luma sample. The variable invSample is derived as follows:

invSample=InputPivot[idxYInv]+(InvScaleCoeff[idxYInv]*(lumaSample−LmcsPivot[idxYInv])+(1<<(SCALE_FP_PREC−1)))>>SCALE_FP_PREC The inverse mapped luma sample invLumaSample is derived as follows:

invLumaSample=Clip1 (invSample)

The Case Chroma Scaling being Enabled

In this case, the process to find the chroma scaling value becomes

1. Find the reference luma sample value (S)
2. Idx=MapIdxRtoIdxO [(S>>LOG2_INVERSE_INTERVAL)]
3. The chroma scaling factor (varScale)=ChromaScaleCoeff[Idx]

Method 2.3 Compare at Most N Times when Deriving the Index of the Piece in the Original Domain The luma samples in the reshaped domain are divided into multiple pieces with interval equal to (1<<LOG2_INVERSE_INTERVAL). For each interval, there exist N thresholds. By comparing the to-be-mapped luma sample with the N thresholds, the inverse index can be found. To make sure that there only exist N turning points in each interval, there is a bitstream conformance that there can only exist N turning points in each interval. If more than N turning points are in the same interval, the number of codewords in that interval should be adjusted.

When finding the inverse index of a luma sample, we first find the interval index in the reshaped domain by (luma sample>>LOG2_INVERSE_INTERVAL), and then compare the luma sample with the N thresholds in that interval to find the correct index of the piece in the original domain. In one embodiment, the N is equal to 1, 2, 3, 4, . . . 15.

Method 3—Simplified Inverse Mapping—Compare at Most N Times when Deriving the Index of the Piece in the Original Domain To simplify the process used to derive the interval index, it is proposed to compare at most N times when finding the interval index. To achieve this, the luma samples in the reshaped domain are divided into multiple segments with size equal to (1<<LOG2_INVERSE_INTERVAL). For each segment, there exist N threshold values (LmcsSegPivot [((1<<bitDepth)>>LOG2_INVERSE_INTERVAL)]) and one base interval index (idxYBase[((1<<bitDepth)>>LOG2_INVERSE_INTERVAL)+1]). In one embodiment, LOG2_INVERSE_INTERVAL is equal to 5 and N is equal to 1, respectively. The following embodiments are for the case when INVERSE_INTERVAL is equal to 5 and N is equal to 1.

In another embodiment, the luma samples in the reshaped domain are divided into (1<<K) equal-size segments. For each segment, there exist N threshold values (LmcsSegPivot) and one base interval index (idxYBase).

In one embodiment, bitDepth is equal to 10, K is equal to 5 and N is equal to 1, respectively. The following embodiments are for the case when bitDepth is equal to 10, K is equal to 5, and N is equal to 1.

In another embodiment, the number of segments is multiples of the number of intervals of the LMCS piece-wise mapping curve. In one embodiment, if the number of intervals of the LMCS piece-wise mapping curve is equal to X, the number of segments is equal to M*X, where M is an integer, and can be 2, 3, 4, 5, 6, 7 . . . , etc.

In one embodiment, M is equal to 2, if the number of intervals of the LMCS piece-wise mapping curve is equal to 16 (=$2^4$), the number of segments is equal to 32 (=$2^5$).

Method 3.1 Inverse Luma Mapping with Equal-Size Segments

For each segment, an index (idxYSeg), which is calculated by dividing the to-be-mapped luma sample by 32, specifies the index of the current segment. In another embodiment, idxYseg is derived by taking the first 5 MSB (most significant bits) of the luma samples. In another embodiment, idxYseg is derived by dividing the to-bemapped luma sample with $(1<<(bitDeptn-K))$. The idxY-Base [idxYSeg] is the interval index of the lowest mapped luma sample in the segment with index equal to idxYSeg. It is derived by comparing the lowest mapped luma sample in the current segment to at most 15 LmcsPivot values. The LmcsSegPivot[idxYSeg] is set equal to LmcsPivot[idxY-Base [idxYSeg]+1]. When finding the interval index (idxY-inv) of any luma sample (lumaSample), the following steps are applied.

1. Derive idxYSeg by dividing the lumaSample by 32.
2. By comparing lumaSample with the LmcsSegPivot [idxYSeg], the inverse interval
   index (idxYInv) can be found.
   if (lumaSample<LmcsPivot[lmcs_min_bin_idx+1])
      idxYInv=lmcs_min_bin_idx
   else if (lumaSample>=LmcsPivot[LmcsMaxBinIdx])
      idxYInv=LmcsMaxBinIdx
   else {
      idxYInv=(lumaSample>=LmcsSegPivot [idxYSeg])?
      idxYBase [idxYSeg]+1: idxYBase [idxYSeg]
   }

In another embodiment, when finding the interval index (i.e., idxYinv) of any luma sample (i.e., lumaSample), the following steps are applied.

1. Derive idxYSeg by dividing the lumaSample by 32 or by taking the first 5 MSB of the luma sample.
2. By comparing lumaSample with the LmcsSegPivot [idxYSeg], the inverse interval index (idxYInv) can be found.
   idxYInv=(lumaSample>=LmcsSegPivot [idxYSeg])?
      idxYBase [idxYSeg]+1: idxYBase [idxYSeg]

When chroma scaling is enabled, Step 1 and Step 2 are applied to derive the interval index of the reference luma sample.

When deriving the inverse luma sample, the following steps are applied:

1. The inverse luma sample is derived as follows:
   invSample=InputPivot[idxYInv]+(InvScaleCoeff[idxY-Inv]*(lumaSample−LmcsPivot[idxYInv])+
      $(1<<10))>>11$
2. Clip the invSample into a 10-bit value.

Method 3.2 Inverse Luma Mapping with Equal-Size Segments and Reduced Bit Depth

In this method, the bit depth of the calculation of inverse mapping is further reduced by constraining the term (e.g., (lumaSample−LmcsPivot[idxYInv])) used to multiply the scaling factor in the range of [−32, 31].

For each segment, an index (idxYSeg), which is calculated by dividing the to-be-mapped luma sample by 32, specifies the index of the current segment. In another embodiment, idxYseg is derived by taking the first 5 MSB of the luma samples. In another embodiment, idxYseg is derived by dividing the to-be-mapped luma sample with $(1<<(bitDeptn-K))$. The idxYBase[i], with i=0 . . . $((1<<bitDepth)>>5))-1$, is the interval index of the lowest mapped luma sample in segment with index equal to i. Each one of the idxYBase[i] is derived by comparing the lowest mapped luma sample in the (i+1)-th segment to at most 15 LmcsPivot values. The LmcsSegPivot[i], with with i=0 . . . $((1<<bitDepth)>>5)-1$ is derived as follows. If there is only one turning point in the (i+1)-th segment, the LmcsSegPivot[i] is set equal to LmcsPivot[idxYBase [i]+1]; otherwise, it is set to (i+1)*32 (or equatl to i*(1<<(bitDepth-K))).

Whether there is only one turning point in a segment with index "i" can be known by comparing the idxYBase [i] and idxYBase [i+1]. If these two values are the same, and LmcsPivot[LmcsMaxBinIdx+1] is not in the current segment, or LmcsPivot[LmcsMaxBinIdx+1] is in the current segment and LmcsPivot[LmcsMaxBinIdx+1] is equal to i*32 (or equal to i*(1<<(bitDepth-K))), it means that there is no turning point; otherwise, there is one turning point in the (i+1)-th segment. The inputSegPivot[i], with i=0 . . . $((1<<bitDepth)>>5)-1$ is set equal to the inverse mapped luma sample of the LmcsSegPivot[i], and the derivation follows the original design. In another embodiment, if there is no turning point in the current segment, the InputSegPivot [i] is set equal to the inverse mapped luma sample of the luma sample i*32, and the derivation follows the original design.

When finding the interval index (idxYinv) of any luma sample (lumaSample), the following steps are applied.

1. Derive idxYSeg by dividing the lumaSample by 32
2. By comparing lumaSample with the LmcsSegPivot [idxYSeg], the inverse interval index (idxYInv) can be found.
   if (lumaSample<LmcsPivot[lmcs_min_bin_idx+1])
      idxYInv=lmcs_min_bin_idx
   else if (lumaSample>=LmcsPivot[LmcsMaxBinIdx])
      idxYInv=LmcsMaxBinIdx
   else {
      idxYInv=(lumaSample>=LmcsSegPivot [idxY-Seg])? idxYBase [idxYSeg]+1
      idxYBase [idxYSeg]
   }

In another embodiment, when finding the interval index (idxYinv) of any luma sample (lumaSample), the following steps are applied.

1. Derive idxYSeg by dividing the lumaSample by 32 or by taking the 5 MSB of the luma sample
2. By comparing lumaSample with the LmcsSegPivot [idxYSeg], the inverse interval index (idxYInv) can be found.
   idxYInv=(lumaSample>=LmcsSegPivot [idxYSeg])?
      idxYBase [idxYSeg]+1: idxYBase [idxYSeg]

When chroma scaling is enabled, Step 1 and Step 2 are applied to derive the interval index of the reference luma sample.

When deriving the inverse luma sample, the following steps are applied:

1. The inverse luma sample is derived as follows:
   idxYSeg=(lumaSample>>5) or idxYSeg=the first 5 MSB of lumaSample invSample=InputSegPivot[idxYSeg]+ (InvScaleCoeff[idxYInv]*(lumaSample−LmcsSeg-Pivot[idxYSeg])+(1<<10))>>11
   In another embodiment, if there is no turning point in the current segment, the InputSegPivot[i] is set equal to the inverse mapped luma sample of the luma sample idxY-Seg*32, and the derivation follows the original design. The inverse mapping can be derived by:
   invSample=InputSegPivot[idxYSeg]+(InvScaleCoeff [idxYInv]*(lumaSample−(idxYSeg<<5))+
      (1<<10))>>11
2. Clip the invSample into a 10-bit value.

Method 3.3 Constraints to Ensure there are Only N Turning Points in One Segment

To make sure that there only exist N turning points in each interval (or called each segment), there is a bitstream conformance or a normative constraint where there can only exist N turning points in each interval. If more than N turning points are in the same interval, the number of codewords in that interval should be adjusted.

In one embodiment, for the variable LmcsPivot[i] with i=lmcs_min_bin_idx . . . LmcsMaxBinIdx, it is a requirement of bitstream conformance that (LmcsPivot[i]>>5) and (LmcsPivot[i+1]>>5) shall not be the same.

In another embodiment, for the variable LmcsPivot[i] with i=lmcs_min_bin_idx . . . LmcsMaxBinIdx, it is a requirement of bitstream conformance that (LmcsPivot[i]>>LOG2_INVERSE_INTERVAL) and (LmcsPivot[i+1]>>LOG2_INVERSE_INTERVAL) shall not be the same. In one embodiment, LOG2_INVERSE_INTERVAL depends on the bit depth of the luma sample, and is equal to bitDepth−5. In one embodiment, LOG2_INVERSE_INTERVAL is equal to 5 and N is equal to 1.

The detection of "more than one turning point" for segment with idxYSeg=0 . . . ((1<<bitDepth)>>5)−1 can be done by following steps:

For interval index intervalIdx=0 . . . 15
1. idxLow=LmcsPivot[intervalIdx]>>5
2. idxHigh=LmcsPivot[intervalIdx+1]>>5
3. If idxLow is equal to idxHigh, LmcsPivot[intervalIdx] is not equal to LmcsPivot[intervalIdx+1], and LmcsPivot[intervalIdx] is not multiples of 32, then "more than one turning point" is detected.

When "more than one turning point" is detected in interval i, the LmcsPivot[i+1] needs to be modified as follows.

adjVal=(idxHigh+1)*32−LmcsPivot[i+1]
LmcsPivot[i+1]=LmcsPivot[i+1]+adjVal
lmcsCW[i]=lmcsCW[i]+adjVal
The following process is applied with j=i+1 . . . 15 until adjVal is equal to 0:
if(lmcsCW[j]<adjVal) {
  lmcsCW[j]=0
  adjVal=adjVal−lmcsCW[j]
}
else {
  lmcsCW[j]=lmcsCW[j]−adjVal
  adjVal=0
}

Although the above samples are for the case when LOG2_INVERSE_INTERVAL is equal to 5 and N is equal to 1. These method can be extended to different settings of LOG2_INVERSE_INTERVAL and N.

In another embodiment, for the variable LmcsPivot[i] with i=lmcs_min_bin_idx . . . LmcsMaxBinIdx, it is a requirement of bitstream conformance that the first 5 MSB of the LmcsPivot[i] and the first 5 MSB of LmcsPivot[i+1] shall not be the same.

Method 3.4 Constraints to Ensure that all Luma Samples in One Segment Belong to at Most Two Different Intervals To achieve using only one comparison for each to-be-mapped luma sample when deriving interval index, there is a bitstream conformance, or an encoder normative constraint or a normative constraint to ensures that all luma samples in one segment belongs to at most two different intervals.

For the variable LmcsPivot[i] with i=lmcs_min_bin_idx . . . LmcsMaxBinIdx, it is a requirement of bitstream conformance that if LmcsPivot[i] is not multiples of 32, then (LmcsPivot[i]>>5) and (LmcsPivot[i+1]>>5) shall not be the same.

In another example, to achieve using only one comparison for each to-be-mapped luma sample when deriving interval index, the number of codewords in each interval is constrained to a certain value. The following embodiments show the bitstream conformance to make sure that in each segment with size equal to OrgCW/2, only one turning point exists.

In one embodiment, for the variable lmcsCW[i] with i=lmcs_min_bin_idx . . . LmcsMaxBinIdx, it is a requirement of bitstream conformance that lmcsCW[i] shall be larger than OrgCW/2−1.

In another embodiment, for the variable lmcsCW[i] with i=lmcs_min_bin_idx . . . LmcsMaxBinIdx, it is a requirement of bitstream conformance that lmcsCW[i] shall be larger than OrgCW/2+1.

Method 4—Chroma Scaling for CIIP

In one embodiment, different modes can use reference luma samples in different positions.

In another embodiment, for blocks whose prediction process can reference neighboring reconstructed samples, the reference luma samples for the scale value derivation are from the neighboring reconstructed samples of the current CU or TU. For example, if the current block is Intra prediction mode, the referenced luma samples is the top-left, top, or left reference boundary samples of current CU, therefore, for Intra sub-partition prediction (ISP) mode, the chroma residuals scaling value is derived using the top-left, top, or left of the L-shape boundary reconstructed samples of the current CU/TU (not the sub-partition TU). In another example, if current block is Intra prediction mode, the referenced luma samples is the top-left reference boundary samples of current TU. Therefore, for Intra sub-partition prediction (ISP) mode, the chroma residuals scaling value is derived using the top-left, top, or left of the L-shape boundary reconstructed samples of the current TU (sub-partition). The top-left L-shape boundary reconstructed sample can be one sample.

In another embodiment, if the current block is Inter prediction modes except for CIIP mode, the reference luma sample(s) can be the top-left luma prediction samples of current CU or TU. For example, if the current CU is Inter prediction mode, but is predicted by combined Inter Intra modes (CIIP) or other prediction methods that need the neighboring reconstructed samples, the referenced luma samples can be the reference boundary reconstructed samples of the current CU or TU as described above. For example, the top-left neighboring reconstructed sample can be used.

In another embodiment, if the current block is Inter prediction modes, the reference luma sample(s) can be the top-left luma prediction samples of the current CU or TU. For example, if the current block is CIIP mode, the reference luma sample(s) can be the top-left luma prediction samples of the current CU or TU.

In another embodiment, if the current block is IBC mode, the decision of the reference luma samples is the same as Inter prediction mode.

In another embodiment, if the current block is IBC mode, the decision of the reference luma samples is the same as Intra prediction mode.

Any of the foregoing proposed methods can be implemented in encoders and/or decoders. For example, any of the proposed methods can be implemented in a reshape module or a residual scaling/reshape module of an encoder, and/or a reshape module or a residual scaling/reshape module of a decoder. Alternatively, any of the proposed methods can be implemented as a circuit coupled to the reshape module or the residual scaling/reshape module of the encoder and/or the reshape module or the residual scaling/reshape module of the decoder, so as to provide the information needed by the reshape module or the residual scaling/reshape module.

In some embodiment, video encoders have to follow the foregoing syntax design so as to generate the legal bitstream, and video decoders are able to decode the bitstream correctly only if the parsing process is complied with the foregoing syntax design. When the syntax is skipped in the bitstream, encoders and decoders should set the syntax value as the inferred value to guarantee the encoding and decoding results are matched.

Figure 4:
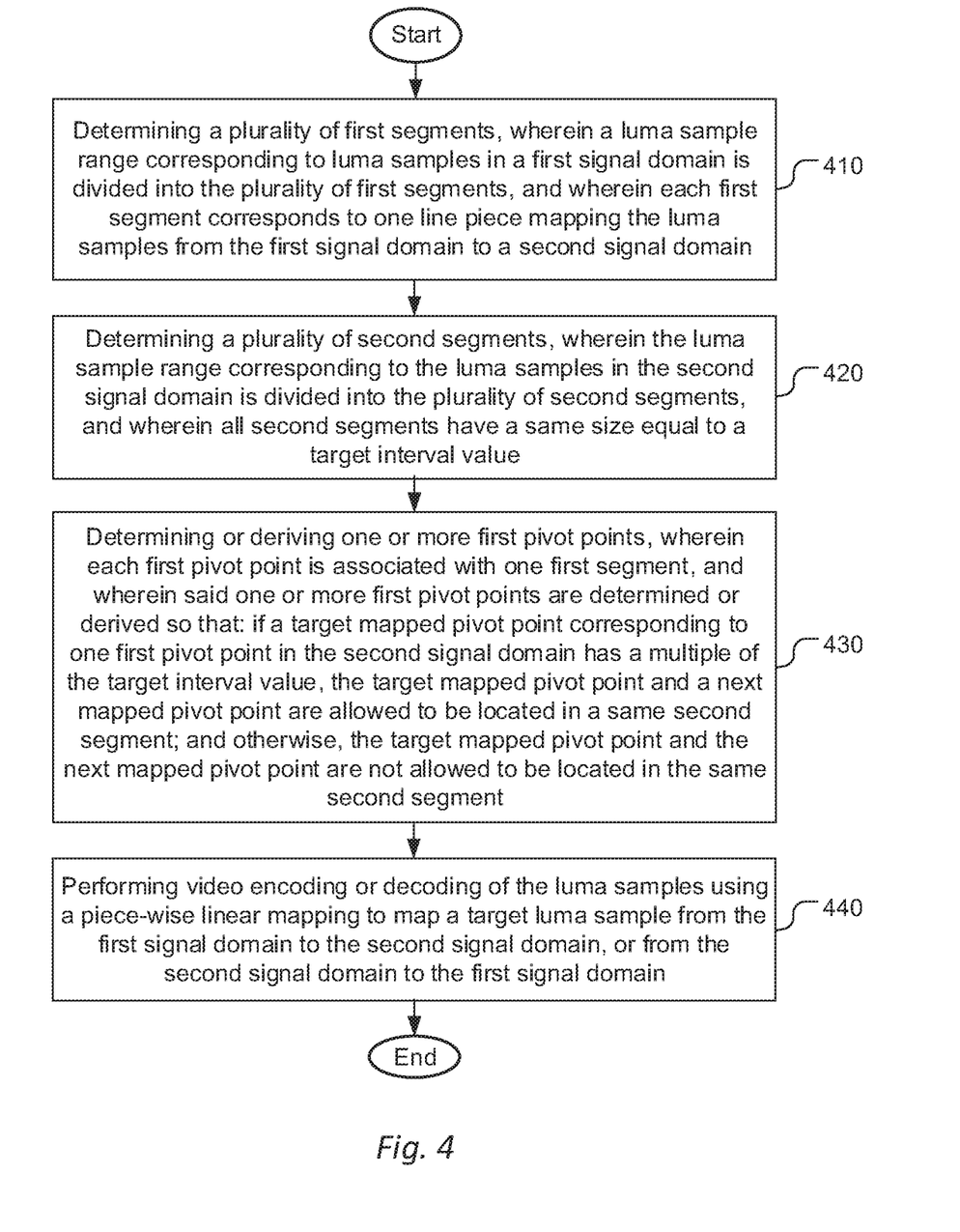
FIG. 4 illustrates a flowchart of an exemplary coding system for determining or deriving pivot points of inverse luma mapping according to an embodiment of the present invention.

FIG. 4 illustrates a flowchart of an exemplary coding system for determining or deriving pivot points of inverse luma mapping according to an embodiment of the present invention. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to this method, a plurality of first segments is determined in step 410, wherein a luma sample range corresponding to luma samples in a first signal domain is divided into the plurality of first segments, and wherein each first segment corresponds to one line piece mapping the luma samples from the first signal domain to a second signal domain. A plurality of second segments is determined in step 420, wherein the luma sample range corresponding to the luma samples in the second signal domain is divided into the plurality of second segments, and wherein all second segments have a same size equal to a target interval value. One or more first pivot points are determined or derived in step 430, wherein each first pivot point is associated with one first segment, and wherein said one or more first pivot points are determined or derived so that: if a target mapped pivot point corresponding to one first pivot point in the second signal domain has a multiple of the target interval value, the target mapped pivot point and a next mapped pivot point are allowed to be located in a same second segment; and otherwise, the target mapped pivot point and the next mapped pivot point are not allowed to be located in the same second segment. Video encoding or decoding of the luma samples are performed using a piece-wise linear mapping to map a target luma sample from the first signal domain to the second signal domain, or from the second signal domain to the first signal domain in step 440.

The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding, the method comprising:
   determining a plurality of first segments, wherein a luma sample range corresponding to luma samples in a first signal domain is divided into the plurality of first segments, and wherein each first segment corresponds to one line piece mapping the luma samples from the first signal domain to a second signal domain;
   determining a plurality of second segments, wherein the luma sample range corresponding to the luma samples in the second signal domain is divided into the plurality of second segments, and wherein all second segments have a same size equal to a target interval value;
   determining or deriving one or more first pivot points, wherein each first pivot point is associated with one first segment, and wherein said one or more first pivot points are determined or derived so that: if a target mapped pivot point corresponding to one first pivot point in the second signal domain has a multiple of the target interval value, the target mapped pivot point and a next mapped pivot point are allowed to be located in a same second segment; and otherwise, the target mapped pivot point and the next mapped pivot point are not allowed to be located in the same second segment; and
   performing video encoding or decoding of the luma samples using a piece-wise linear mapping to map a target luma sample from the first signal domain to the second signal domain, or from the second signal domain to the first signal domain.

2. The method of claim 1, wherein the piece-wise linear mapping is associated with the plurality of first segments, the plurality of second segments and said one or more first pivot points.

3. The method of claim 1, wherein all of the first segments have a same first interval value.

4. The method of claim 3, wherein the first interval value corresponds to 2 to a power of a first pre-defined number and the first pre-defined number is an integer.

5. The method of claim 4, wherein the first pre-defined number is equal to (bitDepth−4) and the bitDepth represents bit depth of the luma samples.

6. The method of claim 1, wherein the target interval value corresponds to 2 to a power of a second pre-defined number and the second pre-defined number is an integer.

7. The method of claim 6, wherein the second pre-defined number is equal to (bitDepth−5) and the bitDepth represents bit depth of the luma samples.

8. The method of claim 1, wherein each second segment has at most two mapped pivot points.

9. The method of claim 1, wherein the luma sample range is equal to 0 to 1023, inclusive, and the target interval value is equal to 32.

10. An apparatus of video coding, the apparatus comprising one or more electronic circuits or processors arranged to:
determine a plurality of first segments, wherein a luma sample range corresponding to luma samples in a first signal domain is divided into the plurality of first segments, and wherein each first segment corresponds to one line piece mapping the luma samples from the first signal domain to a second signal domain;
determine a plurality of second segments, wherein the luma sample range corresponding to the luma samples in the second signal domain is divided into the plurality of second segments, and wherein all second segments have a same size equal to a target interval value;
determine or derive one or more first pivot points, wherein each first pivot point is associated with one first segment, and wherein said one or more first pivot points are determined or derived so that: if a target mapped pivot point corresponding to one first pivot point in the second signal domain has a multiple of the target interval value, the target mapped pivot point and a next mapped pivot point are allowed to be located in a same second segment; and otherwise, the target mapped pivot point and the next mapped pivot point are not allowed to be located in the same second segment; and
perform video encoding or decoding of the luma samples using a piece-wise linear mapping to map a target luma sample from the first signal domain to the second signal domain, or from the second signal domain to the first signal domain.

11. The apparatus of claim 10, wherein the piece-wise linear mapping is associated with the plurality of first segments, the plurality of second segments and said one or more first pivot points.

12. The apparatus of claim 10, wherein all of the first segments have a same first interval value.

13. The apparatus of claim 12, wherein the first interval value corresponds to 2 to a power of a first pre-defined number and the first pre-defined number is an integer.

14. The apparatus of claim 13, wherein the first pre-defined number is equal to (bitDepth−4) and the bitDepth represents bit depth of the luma samples.

15. The apparatus of claim 10, wherein the target interval value corresponds to 2 to a power of a second pre-defined number and the second pre-defined number is an integer.

16. The apparatus of claim 15, wherein the second pre-defined number is equal to (bitDepth−5) and the bitDepth represents bit depth of the luma samples.

17. The apparatus of claim 10, wherein each second segment has at most two mapped pivot points.

18. The apparatus of claim 10, wherein the luma sample range is equal to 0 to 1023, inclusive, and the target interval value is equal to 32.

* * * * *